United States Patent
Kanduth et al.

(10) Patent No.: US 8,580,030 B2
(45) Date of Patent: Nov. 12, 2013

(54) CONCRETE MIX HAVING ANTI-EFFLORESCENCE PROPERTIES AND METHOD OF MAKING CONCRETE USING THE SAME

(75) Inventors: Berndt Kanduth, Quebec (CA); Jean-Bernard Gelinas, Candiac (CA)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 13/496,252

(22) PCT Filed: Sep. 17, 2010

(86) PCT No.: PCT/IB2010/002332
§ 371 (c)(1),
(2), (4) Date: May 24, 2012

(87) PCT Pub. No.: WO2011/033372
PCT Pub. Date: Mar. 24, 2011

(65) Prior Publication Data
US 2012/0227632 A1   Sep. 13, 2012

Related U.S. Application Data

(60) Provisional application No. 61/277,477, filed on Sep. 25, 2009.

(30) Foreign Application Priority Data

Sep. 18, 2009  (EP) .................................... 09011916

(51) Int. Cl.
 *C04B 20/10* (2006.01)
 *C04B 28/04* (2006.01)
(52) U.S. Cl.
 USPC ........... 106/802; 106/724; 106/728; 106/806; 106/810; 106/816; 106/817
(58) Field of Classification Search
 USPC .......... 106/724, 728, 802, 806, 810, 816, 817
 See application file for complete search history.

(56) References Cited

U.S. PATENT DOCUMENTS

| 4,753,679 A * | 6/1988 | Damiano et al. ............... 106/664 |
| 5,460,648 A | 10/1995 | Walloch et al. |
| 5,922,124 A | 7/1999 | Supplee |
| 6,258,161 B1 | 7/2001 | Kerkar et al. |
| 6,537,366 B1 | 3/2003 | Supplee |
| 2006/0054056 A1 | 3/2006 | Jungk |

FOREIGN PATENT DOCUMENTS

| DE | 199 05 488 A1 | 8/2000 |
| DE | 20 2006 00 942 U1 | 9/2006 |
| DE | 10 2006 020 877 A1 | 11/2007 |
| EP | 1 688 400 A2 | 8/2006 |
| WO | 9928264 | 6/1999 |
| WO | 20061340480 A1 | 12/2006 |
| WO | 2007084794 A2 | 7/2007 |
| WO | WO 2008068322 A1 * | 6/2008 |

OTHER PUBLICATIONS

The International Search Report dated Jan. 28, 2011, for PCT Application No. PCT/IB2010/002332.
The Written Opinion of the International Searching Authority dated Jan. 28, 2011, for PCT Application No. PCT/IB2010/002332.

* cited by examiner

*Primary Examiner* — Anthony J Green
(74) *Attorney, Agent, or Firm* — Amster, Rothstein & Ebenstein LLP

(57) ABSTRACT

A concrete mix useful for producing concrete products having anti-efflorescence properties and a method for making such concrete products are provided. The concrete mix includes a hydraulic cement binder, aggregates and as an additive an ultrafine particulate material including carrier particles being surface treated with an efflorescence control agent. The method for making concrete includes a first step of mixing the hydraulic cement binder, aggregates, water and the ultrafine particulate material, a second step of pouring the mixture so obtained into a form, and a third step of curing the mixture.

16 Claims, 15 Drawing Sheets

SEM08019 – Réf. 2

3A          3B

SEM08019 – Réf. 2

4A          4B

SEM08019 – Réf. 2

5A  5B

SEM08019 – Réf. 2

1A      1B
SEM08019 – 10 %

SEM08019 – 10 %

SEM08019 – 10 %

SEM08019 – 15 %

3A 3B
SEM08019 – 15 %

SEM08019 – 15 %

CONCRETE MIX HAVING ANTI-EFFLORESCENCE PROPERTIES AND METHOD OF MAKING CONCRETE USING THE SAME

CROSS-REFERENCE TO RELATED APPLICATIONS

This application is U.S. National phase of PCT Application No. PCT/IB2010/002332, filed Sep. 17, 2010, which claims priority to European Application No. 09011916.5, filed Sep. 18, 2009 and U.S. Provisional Application No. 61/277,477, filed Sep. 25, 2009.

FIELD OF THE INVENTION

The invention relates to a concrete mix useful in the field of masonry such as for industrial or private construction. More particularly, the invention features a concrete mix having anti-efflorescence properties. The anti-efflorescence properties are obtained by the introduction in the concrete mix of an ultrafine particulate material having particles surface treated with an efflorescence control agent. The invention also relates to the use of such an ultrafine particulate material as an additive in a concrete mix and to a method of making a concrete with anti-efflorescence properties.

DESCRIPTION OF THE PRIOR ART

Efflorescence is a common phenomenon observed on the surface of masonry, including brick and concrete products. It consists of a whitish crystalline deposit on the surface of the products. One problem raised by its occurrence is the unaesthetic aspect of the masonry. But more importantly, efflorescence may also raise damage to the masonry from the growth of salt crystals near its surface.

As water moves through a masonry product, it picks up dissolving salts, such as calcium hydroxide, and when it reaches the surface of the product, it evaporates, leaving the salt deposit on the surface. The calcium hydroxide then reacts with carbon dioxide in the air to form calcium carbonate, the whitish deposit.

In addition to the unaesthetic problem mentioned above, the migration of the water-salts solution in the masonry by capillarity may also create a crack formation or widen an existing crack, damaging the masonry, inter alia by creating entry paths for rain or humidity.

Many solutions have been proposed to deal with this efflorescence problem in masonry. For example, it has been proposed to apply waterproof coatings to the surface of the masonry products. But, the application of such coatings is not always effective and is costly.

Also known is US 2006/0054056 which discloses a process to manufacture concrete products with reduced or no efflorescence by using one or more chemicals that can act as water absorbents, which can be absorbents, super absorbents, or thickeners, either alone or in combination with other common concrete additives. This document mentions that one of the ways to diminish efflorescence is to block the pores and capillaries present in concrete or to reduce the number or diameters of them, to diminish and even avoid the diffusion processes. One way disclosed to reduce the pores, and thus efflorescence, is by adding silica fume and/or fly ash into the concrete mixture. This document also mentions that JP 1114774 describes concrete compositions comprising water-absorbing substances, wherein efflorescence is reduced via the use of alkali carbonates.

The use of hydrophobic admixtures, also called efflorescence control agents (ECAs), such as mineral oil, vegetable oils, paraffin waxes, long chain fatty acids, hydrocarbon resins and bitumen, is also a well known technique which has been used to decrease water absorption and then limit efflorescence in concrete. For example, stearate containing materials (e.g. calcium stearate) have been commonly used as ECAs in concrete formulations. Typically, calcium stearate is added as a dispersion in the concrete mix.

U.S. Pat. No. 5,460,648 (Walloch et al.) suggests using as an additive in the concrete mix, a blend comprising a liquid water-insoluble oil (saponified tall oil fatty acid) and an aqueous calcium stearate suspension. The saponified tall oil fatty acid and calcium stearate suspension are pre-combined into a single product before to be added to the concrete mix.

U.S. Pat. No. 5,922,124 (Supplee) broadly discloses adding in the concrete mix at least one particulated polymer in order to increase the performance of the ECA. In the broad disclosure of the invention, the particulated polymer is defined as being at least one of styrene butadiene, polyvinyl acetate, acrylonitrile-butadiene rubber, polyacrylic ester, polyvinylvinylidene, chloride-substituted vinyl chloride, polyethylene-vinylacetate, polyepoxide, polyurethane, acrylic latex and calcium stearate. The ECA is at least one of calcium stearate, zinc stearate or aluminum stearate. Typically, the particulated polymer(s) and the ECA are admixed to the usual concrete components (cement, stone, sand, colorant, water). The only ECA-polymer combination which is exemplified comprises a blend of styrene butadiene, acrylic latex and polyepoxy as the particulated polymer, and a "modified" calcium stearate as the ECA, worth noting that it is not mentioned how the calcium stearate is modified.

U.S. Pat. No. 6,537,366, also from Supplee, describes a concrete mix for coloring concrete, with anti-efflorescence properties, comprising in addition to basic concrete components, i) an ECA such as a stearate, stearic acid derivative, stearic salt and mixture thereof, ii) a particulated polymer as defined above for U.S. Pat. No. 5,922,124, and iii) a colorant. According to the description of U.S. Pat. No. 6,537,366 a dispersion of a stearate-containing compound is first prepared and in a second step the particulated polymer plus a plasticizer are added to the dispersion. Then, the mixture is stabilized and finally the colorant is added.

U.S. Pat. No. 6,258,161 (Kerkar et al.) discloses avoiding efflorescence and improving freeze-thaw durability of concrete by adding in the concrete formulation ECAs in combination with a betaine, which is an air entraining agent.

Although the dispersion of ECAs in the concrete mix was known and used in the prior art methods, it still presents some drawbacks and is thus not always sufficient. One drawback with the ECAs used in the prior art, is that they are not homogenously dispersed in the concrete formulation, and therefore, the hydrophobic properties of the final concrete product are decreased. It is also recognized that ECAs hinder polymerization of the cementitious materials, therefore yielding to weaker polymer structure and less durable concrete.

Thus, there is still a need for a concrete mix that provides improved anti-efflorescence properties to the final concrete product.

SUMMARY OF THE INVENTION

An object of the present invention is to provide a concrete mix that satisfies the above-mentioned need.

This object is achieved with a concrete mix including an ultrafine particulate material including carrier particles being surface treated with an efflorescence control agent.

According to one aspect of the present invention, there is provided a concrete mix including a hydraulic cement binder, aggregates and an ultrafine particulate material including carrier particles being surface treated with an efflorescence control agent.

Thanks to the use of an ultrafine particulate material including carrier particles having a particle size allowing them to fill in the capillary pores of the concrete product, the dispersion of the efflorescence control agent in the concrete mix is improved and the problem of particle packing of the concrete matrix is avoided.

It is worth mentioning that the expressions "an ultrafine particulate material" and "an efflorescence control agent" include within their meaning the expressions "at least one ultrafine particulate material" and "at least one efflorescence control agent". In other words a concrete mix which includes more than one type of ultrafine particulate material and more than one type of efflorescence control agent falls within the scope of the present invention. The reason why the expression "at least one" has not been used is to prevent the description from being too unwieldy.

According to another aspect of the present invention, there is also provided a method of making a concrete with anti-efflorescence properties. The method includes the steps of:
  a. mixing a hydraulic cement binder, aggregates, water, and an ultrafine particulate material including carrier particles being surface treated with an efflorescence control agent;
  b. pouring the mixture of step a) into a form; and
  c. curing the mixture.

In a further aspect, the present invention is related to the use of an ultrafine particulate material including carrier particles being surface treated with an efflorescence control agent, as an additive in a concrete mix including a hydraulic cement binder, aggregates and water, to reduce efflorescence in a concrete product obtained from the concrete mix.

In one embodiment of the invention, the ultrafine particulate material is present in the concrete mix in an amount representing up to about 15% of the weight of the hydraulic cement binder within the mix.

In another embodiment, the carrier particles of the ultrafine particulate material are selected from clay, chalk, sand, metakaolin, fumed silica, fly ash, ground blast furnace slag, or $CaCO_3$. In a preferred embodiment, the carrier particles are $CaCO_3$ particles.

According to still another embodiment, the efflorescence control agent is selected from the following compounds: calcium stearate, zinc stearate, sodium stearate, butyl stearate, a stearic acid derivative, a stearic acid salt, a tall oil fatty acid, a vegetable or animal fat, an emulsion based on white grease, a silicone compound, a siliconate, a siloxane, a wax, a wax emulsion, a soap, a mineral oil, a paraffin, or a bitumen, and agents like polyacrylates or polyacrylate (poly)ethers. In a preferred embodiment, the efflorescence control agent is stearic acid.

In a further embodiment, the ultrafine particulate material has a medium particle size ranging from about 0.7 to about 8 μm. In a preferred embodiment, the medium particle size of the particulate material is from about 1.4 to about 3 μm. A preferred particle size would be about 1.4 μm. In an another embodiment, the ultrafine particulate material has a medium particle size ranging from about 0.7 to about 100 μm, preferably from about 0.7 to about 45 μm.

The BET specific surface area measured according to the standard ISO 9277 in all embodiments is less than 10 m2/g. For example, such ultrafine particulate material is Omyacarb FT commercialized by the present Applicant and having a BET specific surface area of 5.5 m2/g.

In another embodiment, the hydraulic cement binder is Portland cement.

The invention and its advantages will be better understood upon reading the following description made with reference to the accompanying figures.

DETAILED DESCRIPTION OF PREFERRED EMBODIMENTS

Figure 1:
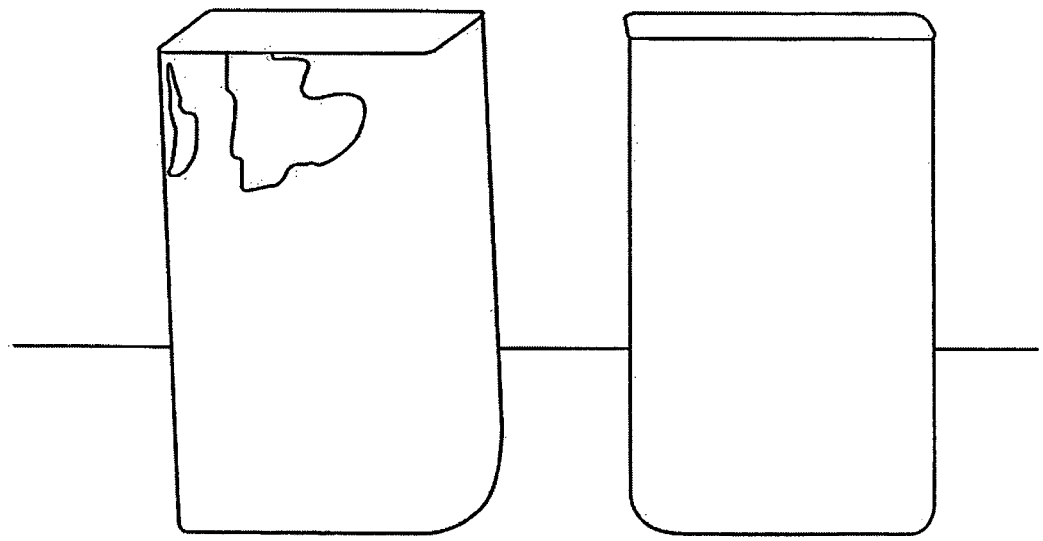
FIGS. 1 to 5 represent photos of prisms made of concrete reference mix Ref 2. Prism specimen A was partially immersed in distilled water to a depth of approximately 1 inch for 7 days and then dried in an oven for 24 hours. Prism specimen B was kept in the same room as prism specimen A, but without immersion in water, for 7 days and then dried in an oven for 24 hours.

An object of the present invention was to find a new and inventive way to incorporate an ECA directly in a concrete mix so that efflorescence does not occur in the masonry made from that concrete mix.

The present inventors achieved their goal when they discover that ECAs can be incorporated into the concrete mix using a carrier particle. More particularly, they discovered that masonry efflorescence can be substantially prevented when they incorporated into the concrete mix an ultrafine particulate material including carrier particles which are surface treated with an ECA.

Therefore, the present invention provides a novel concrete mix including a hydraulic cement binder, aggregates and an ultrafine particulate material including carrier particles being surface treated with an efflorescence control agent.

The invention also provides a method of preparing a concrete form with anti-efflorescence properties using such a concrete mix.

DEFINITIONS

The expression "hydraulic cement binder" according to the invention refers to such cements which harden when mixed with water. For example, the hydraulic cement binder is one of Portland cement; Portland cement blends such as Portland blastfurnace cement, Portland flyash cement, Portland pozzolan cement, Portland silica fume cement, expansive cements, very finely ground cements; or non-Portland hydraulic cements such as pozzolan-lime cements, slag-lime cements, supersulfated cements, calcium aluminate cements, calcium sulfoaluminate cements, "natural" cements, geopolymer cements. A preferred hydraulic cement binder is Portland cement.

An "ultrafine particulate material" according to the invention is a material which will fill in ultrafine particles. This ultrafine particulate material will fill in the capillary pores of the concrete product. As a first approximation, based on calcium carbonate packed bed experiments, the typical capillary size for irregularly shaped particles is that of the most common number particle size. Therefore, the definition of how fine the ultrafine particles should be must be less than this typical particle size of the cement aggregate structure. This is known to be less than 100 μm. This is measured by porosimetry.

Hence, the size of the ultrafine particles is such that the particles can get in and fit into the capillary pores of the concrete product. In an embodiment, the ultrafine particulate material has a medium particle size ranging from about 0.7 to about 8 μm. In particular, the medium particle size ranges from about 1.4 to about 3 μm. More particularly, the medium particle size is about 1.4 μm.

The particle size of the product is determined on a Micromeritics SediGraph III model 5120. This is an X-ray sedimentation technique that is common and well-known to those in the industry. It is possible to determine the particle size distribution (PSD) at different points in the process. The PSD is first determined on a slurry sample either from the mill during the wet grinding process or from a tank after the mill and prior to drying/surface treating. The PSD may also be determined on an untreated powder sample prior to the surface treater. Finally, the PSD may be determined on the surface treated product.

The "carrier particles" according to the invention consist of support particles that are used to carry the ECA. More particularly, the surface of the particles is treated with the ECA. In an embodiment, the carrier particles are selected from clay, chalk, sand, metakaolin, fumed silica, fly ash, ground blast furnace slag, or $CaCO_3$. Preferably, the carrier particles are $CaCO_3$ particles. The surface treatment of the carrier particles with the ECA can be performed using techniques known in the art.

An "efflorescence control agent" (ECA) according to the invention is a compound capable of preventing or at least limiting the phenomenon of efflorescence in concrete products. In an embodiment, the ECA is one of the following compounds: calcium stearate, zinc stearate, sodium stearate, butyl stearate, a stearic acid derivative, a stearic acid salt, a tall oil fatty acid, a vegetable or animal fat, an emulsion based on white grease, a silicone compound, a siliconate, a siloxane, a wax, a wax emulsion, a soap, a mineral oil, a paraffin, or a bitumen. More preferably, the ECA is stearic acid.

The "aggregates" in the context of the present invention are the inert granular materials such as sand, gravel, and/or crushed stone that, along with water and the cement binder, are the basic ingredients in concrete. The commonly used aggregate grading for concrete is generally as follows.

25-28 mm—3%
19-20 mm—20%
12-15 mm—40%
8-12 mm—37% with 95% of aggregate smaller that 28 mm. The sand size normally ranges from 0 to 4 mm.

The term "form" used in the context of the present invention refers to a determined form in which the concrete is poured before it hardens to give the final masonry unit. For example, the form will allow obtaining a concrete masonry unit such as a segmental retaining wall, a paver, a block (e.g. architectural block, masonry block), pipes (segments, connectors), slabs (e.g. driveways, highways, or patios), or any other unit structure shaped for use in a civil engineering or building structure.

The term "curing" used in the context of the present invention refers to the step in the process of making concrete which follows the pouring into a form of the "liquid" concrete. The curing represents the step wherein the concrete hardens. Usually, after concrete is poured into a form, a specific moisture content and temperature must be maintained to obtain the best quality concrete. Curing has a high influence on the properties of hardened concrete such as its durability, strength and waterproofness.

The term "about" used in the context of the present invention is intended to represent a variation of ±10% of the values provided herein.

DESCRIPTION OF VARIOUS PREFERRED EMBODIMENTS OF THE INVENTION

The present invention concerns the use as an additive in a concrete mix of an ultrafine particulate material consisting of carrier particles which are surface treated with an efflorescence control agent (ECA).

The present inventors have discovered that it was possible to obtain a concrete product having improved anti-efflorescence properties when they incorporated this ultrafine particulate material to the other basic ingredients in concrete, e.g. hydraulic cement binder, aggregates and water.

Furthermore, the present inventors also showed that the compressive strength of the concrete product improved upon addition of the ultrafine particulate material surface treated with ECA to the concrete mix.

In a preferred embodiment of the invention, the hydraulic cement binder is Portland cement. The aggregates used in the concrete mix include sand (fine aggregates), gravel, and/or crushed stone (coarse aggregates). The concrete mix at least includes as basic ingredients Portland cement, sand and water. The ultrafine particulate material which is added to the concrete mix consists of carrier particles which are surface treated with the ECA.

The carrier particles may be for example one of the following compounds: clay, chalk, sand, metakaolin, fumed silica, fly ash, ground blast furnace slag, or $CaCO_3$. In a preferred embodiment, the carrier particles are $CaCO_3$.

The ECA can be one of calcium stearate, zinc stearate, sodium stearate, butyl stearate, a stearic acid derivative, a stearic acid salt, a tall oil fatty acid, a vegetable or animal fat, an emulsion based on white grease, a silicone compound, a siliconate, a siloxane, a wax, a wax emulsion, a soap, a mineral oil, a paraffin, or a bitumen. StearIn particular, the ECA is a stearate. More particularly, the efflorescence control agent is stearic acid.

In a specific embodiment of the invention the ultrafine particulate material consists of $CaCO_3$ particles surface treated with stearic acid.

The ultrafine particulate material has in general a medium size a ranging from about 0.7 to about 8 μm. In a preferred embodiment, the medium particle size ranges from about 1.4 to about 3 μm. In a particular embodiment, the medium particle size is about 1.4 μm.

In a specific embodiment of the invention the ultrafine particulate material consists of $CaCO_3$ particles surface treated with stearic acid, and has a medium particle size of about 1.4 μm. For example, such ultrafine particulate material is OMYCARB® FT commercialized by the present Applicant.

Of course, other additives well known in the art could be added to the concrete mix without departing from the scope of the invention. For example, one could add water-reducing agents, retarding agents, accelerating agents, superplasticizers, corrosion-inhibiting agents, pigments, surfactants, air entraining agents etc. . . . .

The quantities of each basic ingredient present in the concrete prepared according to the invention, i.e. Portland cement, aggregates and water, will depend on the type of concrete product one will produce. The person skilled in the art will be able to adjust these quantities depending on the desired final concrete product, based on common knowledge and optionally some routine tests.

To these basic ingredients, is added the anti-efflorescence ultrafine particulate material. In an embodiment, the amount of the ultrafine particulate material represents up to about 15% of the weight of the hydraulic cement binder (e.g. Portland cement) in the concrete mix.

Examples of concrete mix to which the anti-efflorescence ultrafine particulate material according to the invention can be added includes, without being limited to, air-entrained concrete, ready-mix concrete, mortar, self-compacting concrete, zero-slump concrete and high-strength concrete.

A method to prepare the concrete with improved anti-efflorescence properties according to the invention includes a first step of mixing the hydraulic cement binder (e.g. Portland cement), aggregates, water and the ultrafine particulate material. In an embodiment, the ultrafine particulate material is added in a dry form to improve the dispersion of the ECA through the concrete. Other useful additives can also be added to the concrete at this stage.

Once the concrete is ready, i.e. all the ingredients are well mixed together, the mixture is poured into a form and then cured. The form can be any form which will give the desired concrete masonry unit. For example, it can be a form to obtain a segmental retaining wall, a paver, a block (e.g. architectural block, masonry block), pipes (segments, connectors), slabs (e.g. driveways, highways, or patios), or any other unit structure shaped for use in a civil engineering or building structure. The pouring of the concrete into the form must be carried out carefully. Anyone skilled in the art will know which techniques to use. For example, the concrete should not be poured more rapidly than it can be spread, especially for large surfaces. Bubbles must be avoided.

The curing of the concrete once poured into a form is also an important step of the process since the quality of the resulting concrete masonry will depend on it. A person skilled in the art will know which techniques must be employed to cure the concrete. Usually, after concrete is poured into a form, a specific moisture content and temperature must be maintained to obtain the best quality concrete. Curing has a high influence on the properties of hardened concrete such as its durability, strength and waterproofness.

EXAMPLES

Example 1

Evaluation of Efflorescence in Concrete

The efflorescence in concrete/mortars containing a stearic acid surface treated calcium carbonate product has been evaluated. The evaluation was done in accordance with ASTM C67-07—*Standard Test Methods for Sampling and Testing Brick and Structural Clay Tile*.

The test consisted in an immersion of concrete/mortar specimens in distilled water for a period of 7 days. Following the immersion phase, the specimens were put in a drying oven for 24 hours. Comparative pictures were taken after this last drying phase.

The Mixtures

In this study, three different mortar mixtures were designed. A reference mixture, that showed efflorescence, and two mixtures, based on the reference, with a stearic acid surface treated calcium carbonate product were batched. The surface treated calcium carbonate product (OMYCARB® FT) was incorporated as an addition in the mortars, but not as a cement replacement. All three mixes had a water-binder ratio (w/b) of 0.3 and were not air entrained. The surface treated calcium carbonate product was included in the binder content. The mortar mixtures that were produced are:

Reference (identified as Ref 2)
Based on Reference with addition of 10% OMYACARB® FT (identified as 10%)
Based on Reference with addition of 15% OMYACARB® FT (identified as 15%).

As shown in Table 1, for mixtures containing OMYACARB® FT, the sand content was adjusted to keep the mortar total volume at 1 m$^3$ (1,000 L). Mixing sequence used in the laboratory is given in Table 2. The OMYACARB® FT was the last constituent to be added in the mixer. Fresh properties were determined in compliance with ASTM C185—*Standard Test Method for Air Content of Hydraulic Cement Mortar* and ASTM C1437—*Standard Test Method for Flow of Hydraulic Cement Mortar*.

The mortar was then molded in two layers. A total of 5 prisms, of 100 mm×100 mm×350 mm dimensions, were molded using plastic mold. The fresh properties are presented in Table 1. The flow of all mixes was 0%, which corresponds to a stiff mortar mix. The air contents measured on fresh mortars ranged from 18.7% to 17.5%. The air contents and the flow values were similar for all mortars.

TABLE 1

Mixture compositions

| Mix ID | Ref 2 (w/b = 0.3) | 10% (w/b = 0.3) | 15% (w/b = 0.3) |
| --- | --- | --- | --- |
| Cement (kg/m$^3$)[1] | 525 | 525 | 525 |
| OMYACARB ® FT (kg/m$^3$) | — | 52.5 | 78.8 |
| Water (kg/m$^3$) | 157.5 | 173.3 | 181.1 |
| Sand (kg/m$^3$)[2] | 1750 | 1655 | 1608 |
| Fresh properties | | | |
| Unit Weight (kg/m$^3$) | 2026 | 2022 | 2022 |
| Air content (%) | 18.7 | 18.0 | 17.5 |
| Flow (%) | 0 | 0 | 0 |

[1]Type GU Cement manufactured by Lafarge
[2]Sand - Ladufo, Laval University Laboratory, Qc

TABLE 2

Mixing sequence

| | Reference mixture | | Mixtures with OMYACARB ® FT |
| --- | --- | --- | --- |
| 1 | Water | 1 | Water |
| 2 | Sand (wait until the sand is fully wet) | 2 | Sand (wait until the sand is fully wet) |
| 3 | Cement | 3 | Cement |
| 4 | Mix for 5 minutes | 4 | Mix for 2 minutes |
| | | 5 | OMYACARB? FT |
| | | 6 | Mix for an additional 5 minutes* |

*This amount is necessary to achieve a good homogenization of the mortar mix

Laboratory Test

The curing period for all specimens was 4 days at 23° C. and 100% RH (Relative Humidity). After the curing period, the specimens were cut in two parts of equal length. Parts were kept together in pair; one part was identified A and the second, B. Then the specimens were brushed and washed to remove all dirt and oil residue.

The specimens were placed initially in a drying oven at a temperature of 110° C.±5° C. for at least 24 hours and until two successive weighing, at interval of 2 hours, showed a mass loss not greater than 0.2%. During the test, part A was partially immersed in distilled water, on end, to a depth of approximately 1 in.

The B part was kept in the same room but without distilled water. After a 7-day period in distilled water, the specimens were dried in an oven for 24 hours and visually inspected. After this last drying phase, photos of each pair were taken under an illumination of not less than 50 footcandles (538.2 lm/m²).

Figure 2:
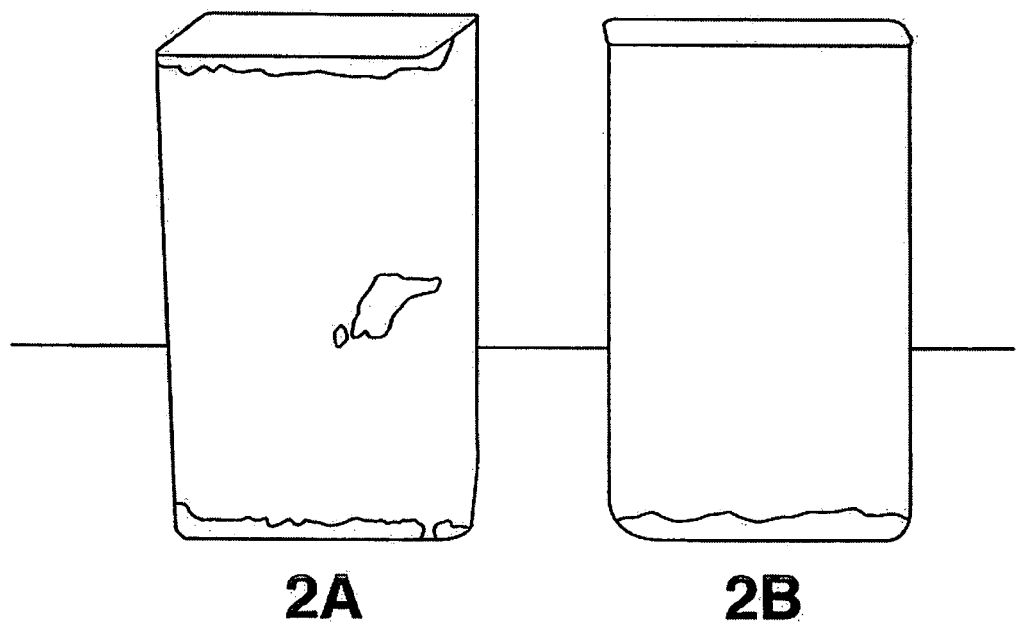
Figure 3:
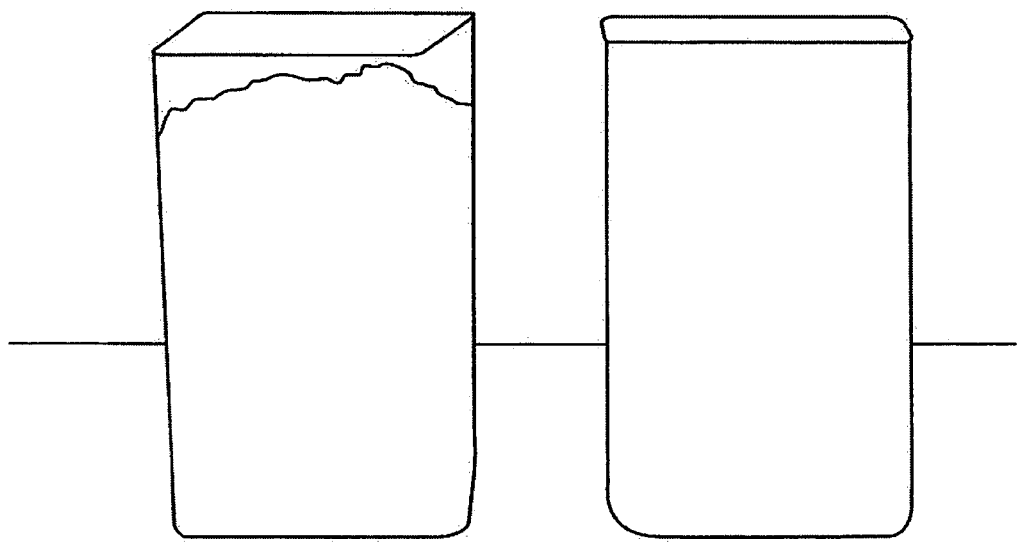
Figure 4:
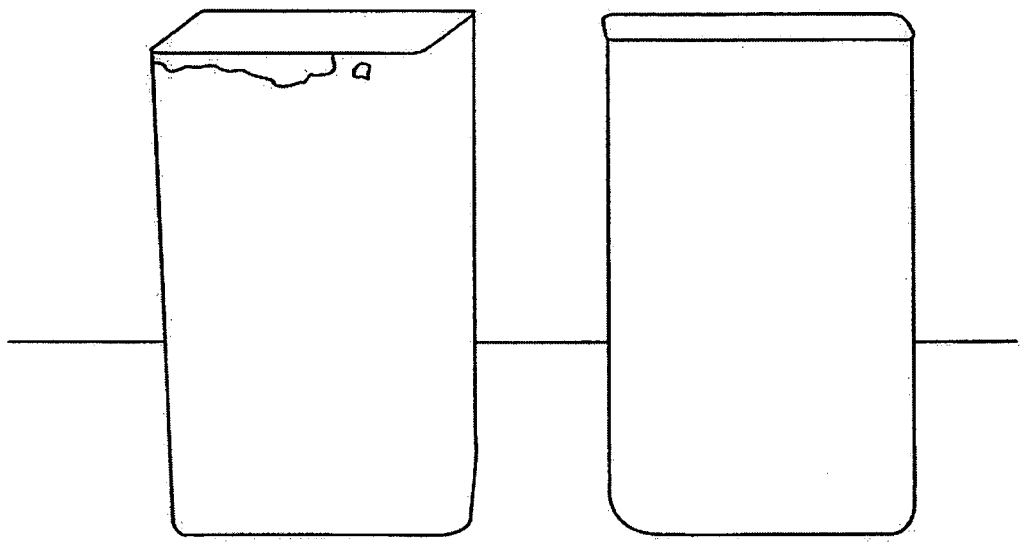
Figure 5:
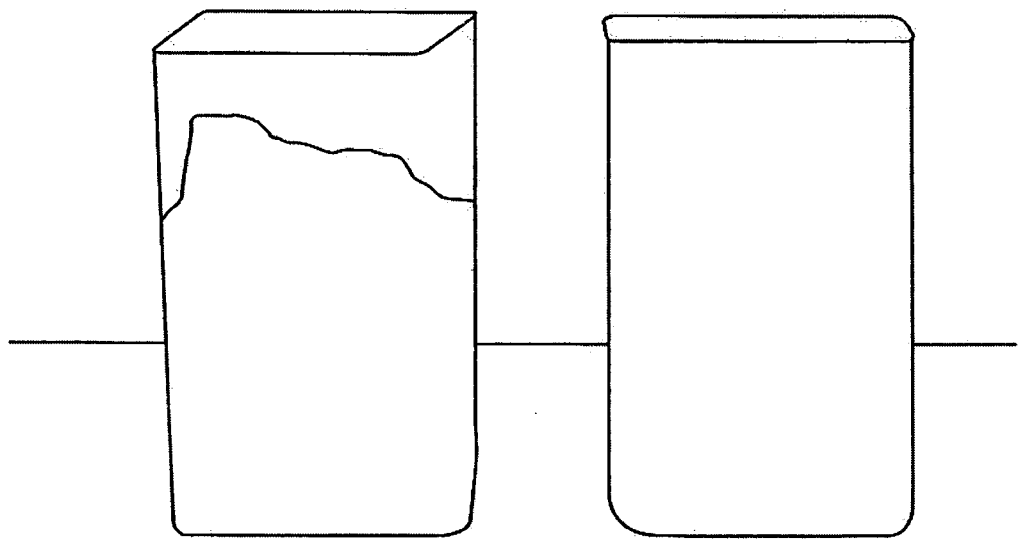
Figure 6:
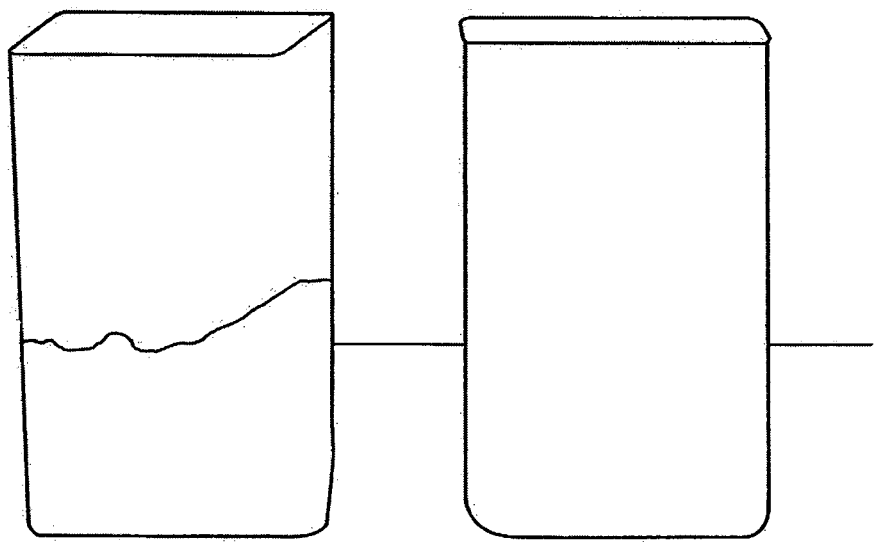
FIGS. 6 to 10 represent photos of prisms made of concrete according to the present invention containing 10% OMYAC-ARB® FT. Prism specimen A was partially immersed in distilled water to a depth of approximately 1 inch for 7 days and then dried in an oven for 24 hours. Prism specimen B was kept in the same room as prism specimen A, but without immersion in water, for 7 days and then dried in an oven for 24 hours.
Figure 7:
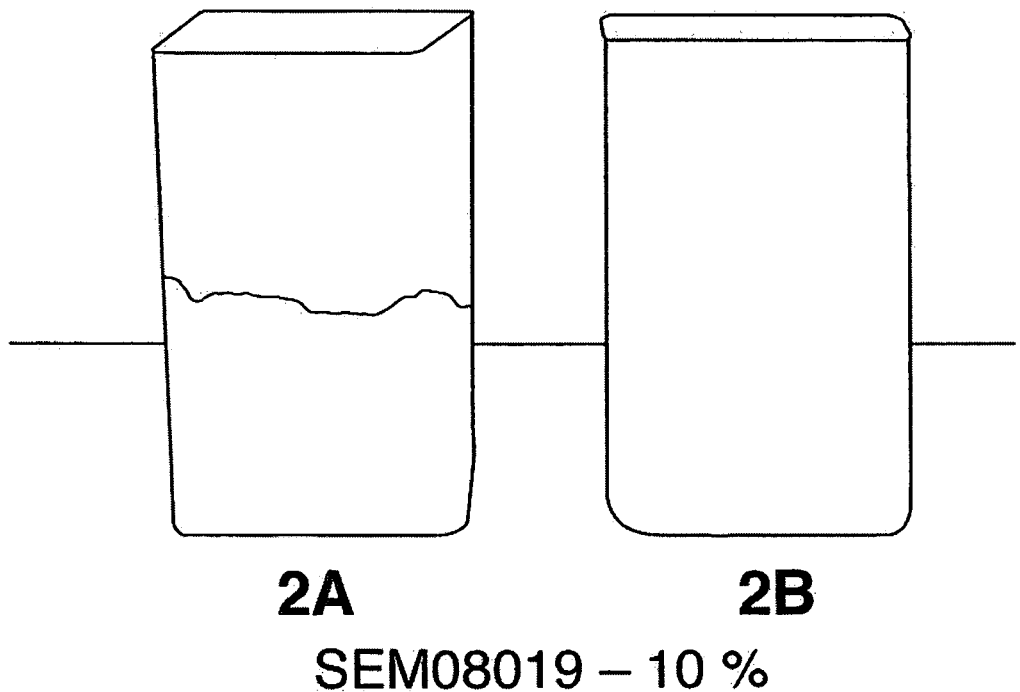
Figure 8:
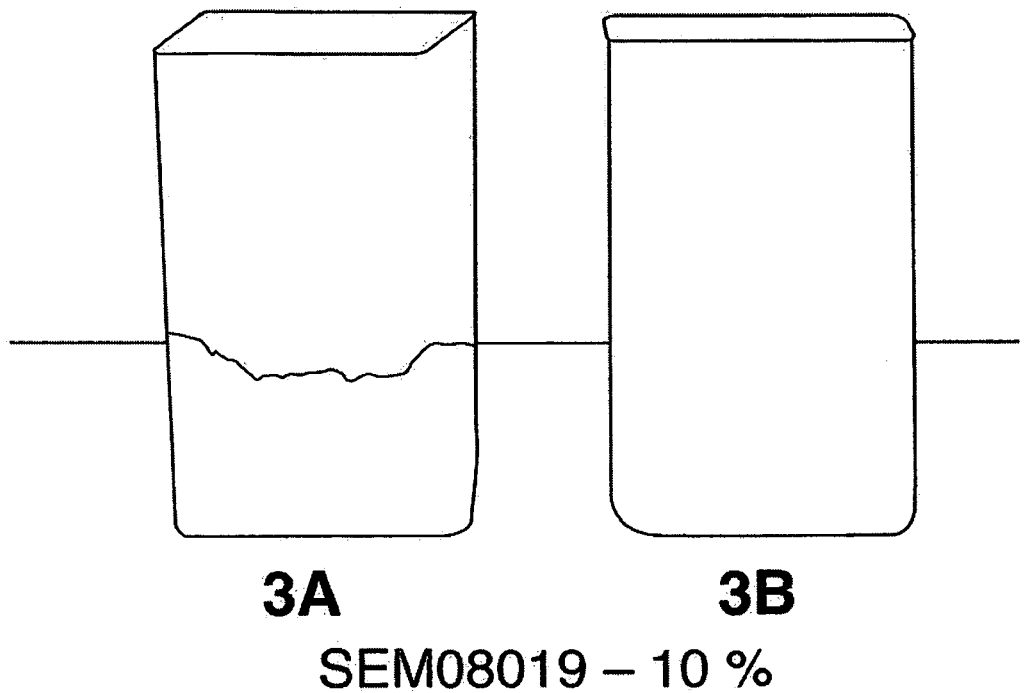
Figure 9:
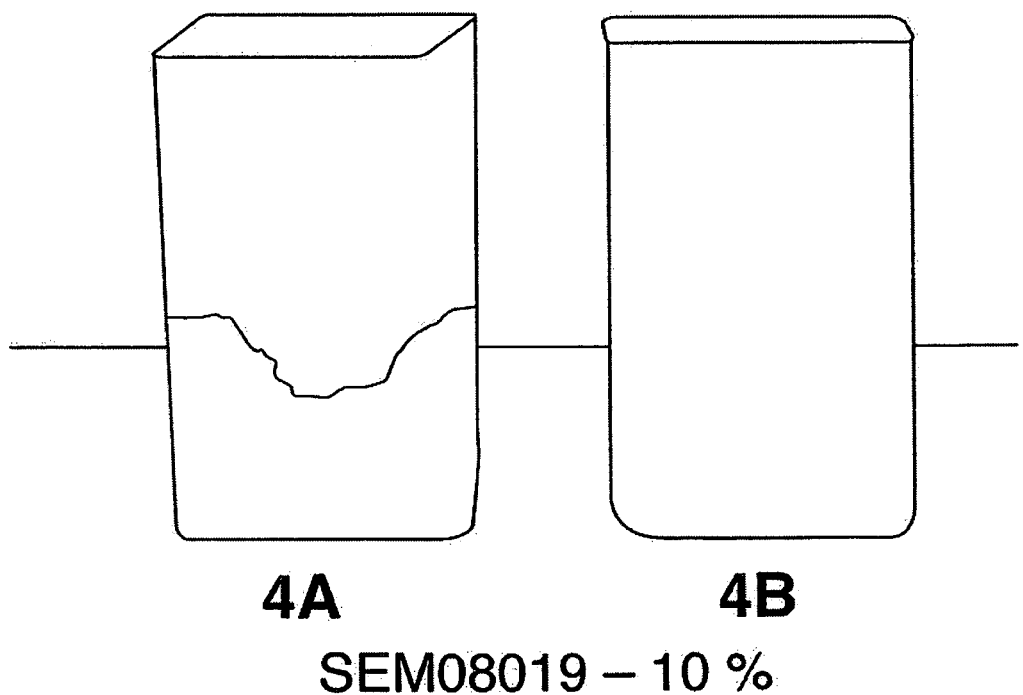
Figure 10:
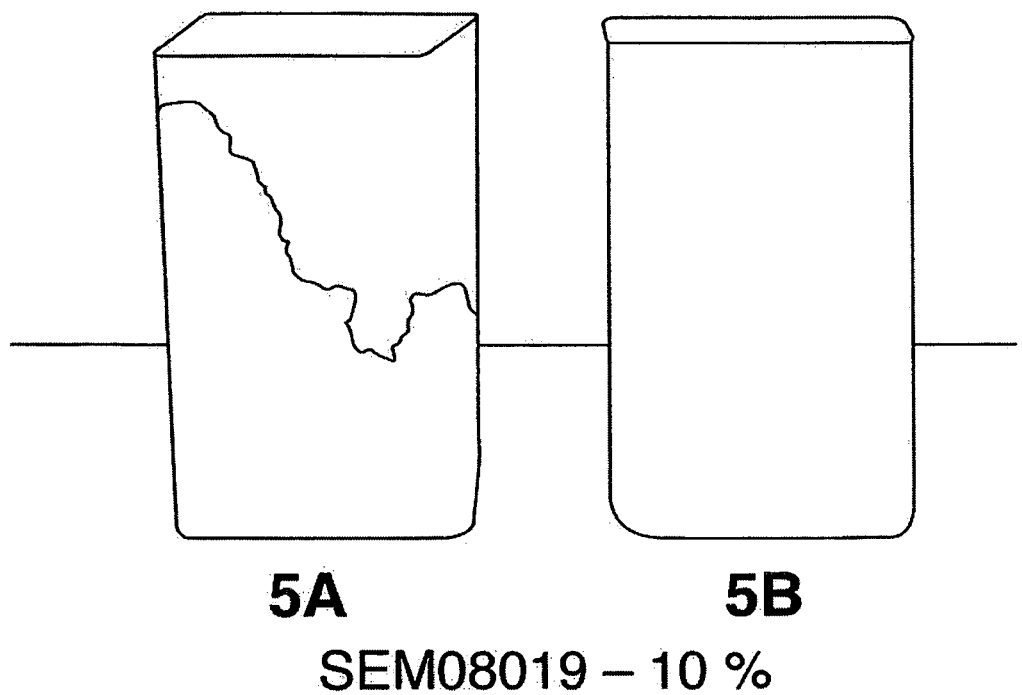
Figure 11:
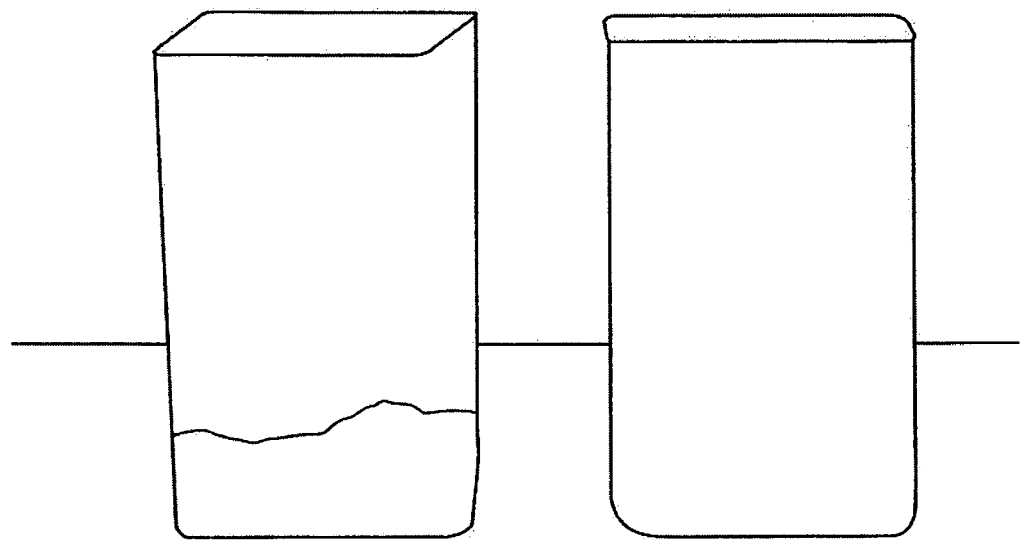
FIGS. 11 to 15 represent photos of prisms made of concrete according to the present invention containing 15% OMYAC-ARB® FT. Prism specimen A was partially immersed in distilled water to a depth of approximately 1 inch for 7 days and then dried in an oven for 24 hours. Prism specimen B was kept in the same room as prism specimen A, but without immersion in water, for 7 days and then dried in an oven for 24 hours.
Figure 12:
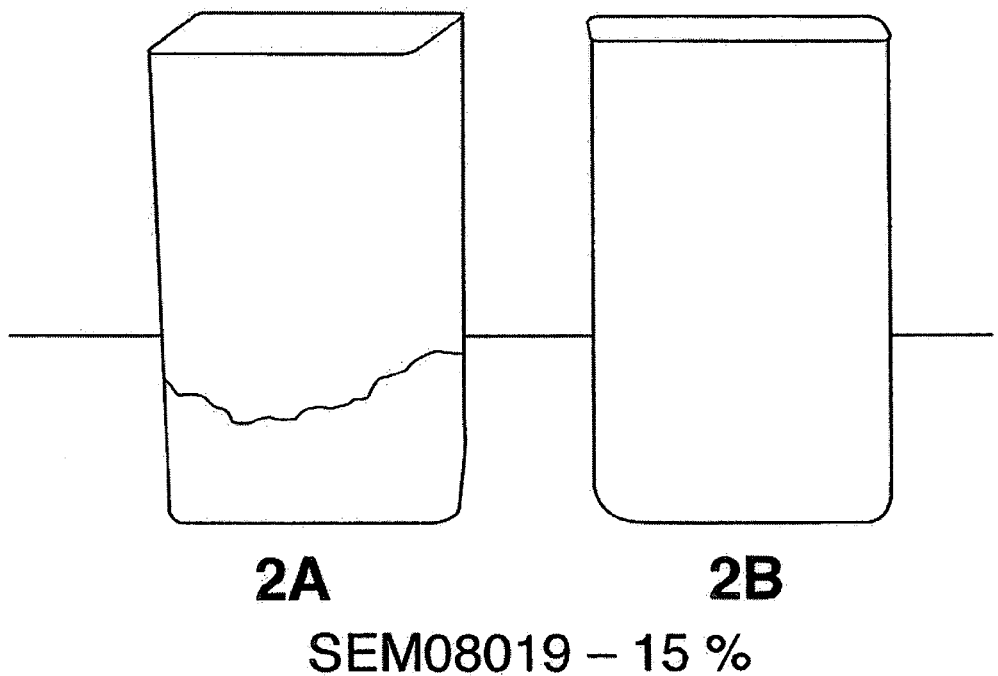
Figure 13:
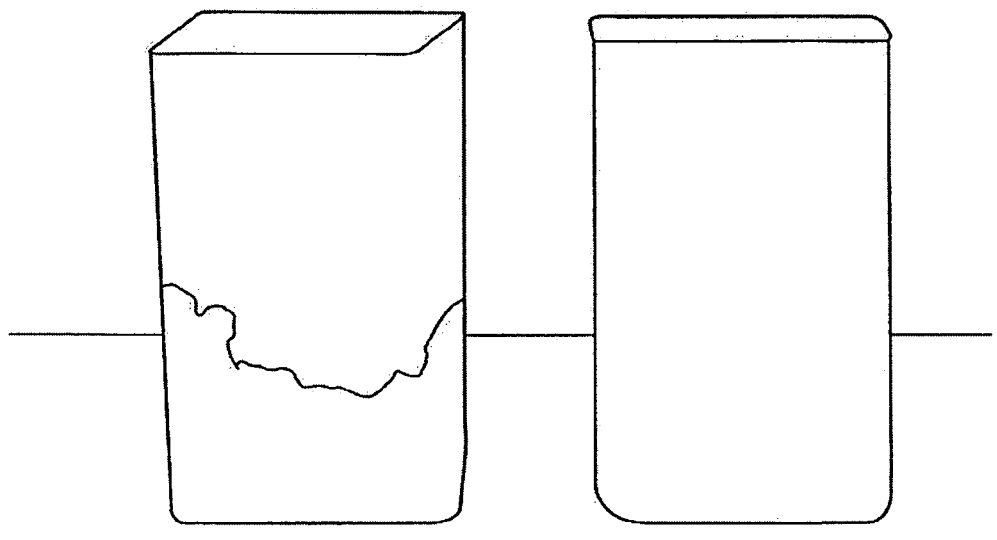
Figure 14:
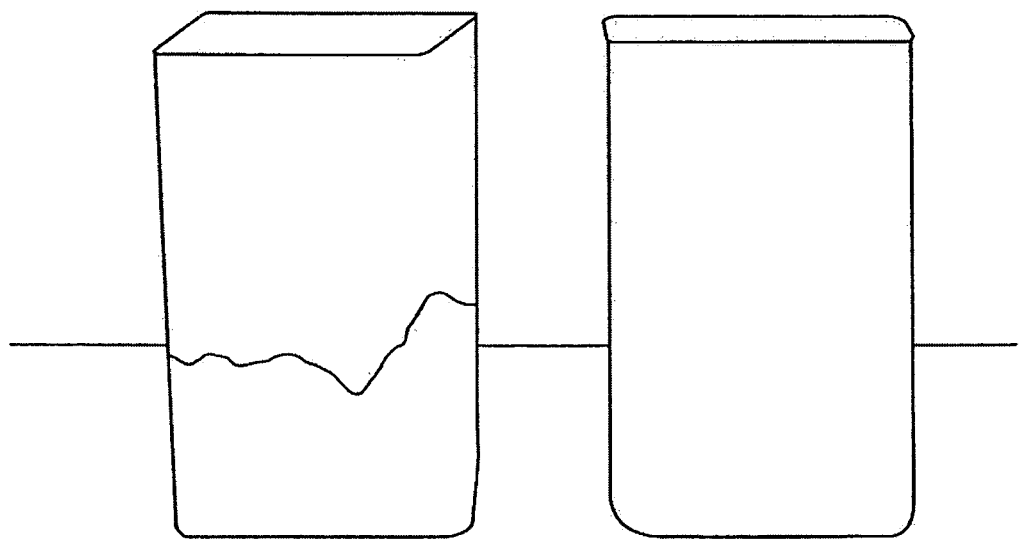
Figure 15:
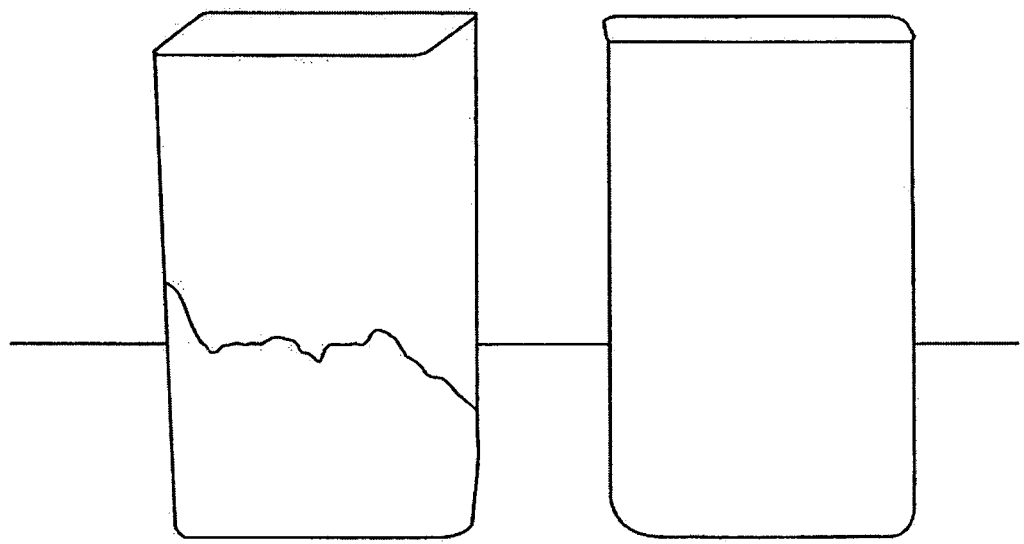

Photos of each specimen are presented in FIGS. 1 to 15. The reference mix is shown in FIGS. 1 to 5 while the specimens from mixes with 10% of OMYACARB® FT and 15% of OMYACARB® FT are shown in FIGS. 6 to 10 and FIGS. 11 to 15, respectively. On each Figure:
- the specimen A is on the left side;
- the maximum water level reached during the test is located by a thick red line;
- efflorescence is shown by arrows or circles.

For Reference specimens (Ref 2), the maximum water level reached the full height of the specimens (see FIGS. 1 to 5). Water was visible on top of the immersed specimens within 24 hours. Efflorescence was observed on every immersed specimen (A). It was even observed on the specimens not immersed (B).

For specimens containing 10% and 15% of OMYACARB® FT, the maximum water level observed on the specimens was lower than the reference mix (see FIGS. 6 to 15). The water level was also lower for the 15% mix when compared to the 10% mix. Since the water line for mixes containing OMYACARB® FT was lower, no efflorescence was found on those specimens.

CONCLUSION

Evaluation of efflorescence in concrete containing a surface treated calcium carbonate product was carried out in accordance with ASTM C67—*Standard Test Methods for Sampling and Testing Brick and Structural Clay Tile*. Based on the laboratory results generated in this study, the addition of OMYACARB® FT did prevent efflorescence by changing the water transport in the mortar mixes. The migration of water in the specimens was slowed by the presence of OMYACARB® FT in the mortar mixes. This is due in part by the hydrophobic property of the product and, by the fine particle size of the product (filler effect). The addition of 10% of OMYACARB® FT was enough to prevent efflorescence.

Example 2

Evaluation of the Compressive Strength in Concrete

The influence of replacing the sand in mortar mixtures by OMYACARB® FT on compressive strength has been evaluated. The percentages of replacement were made according to the quantity of cement as in Example 1 (10% and 15% of the cement weight). Median diameter of the OMYACARB® FT is 1.4 µm.

Mixtures and Fresh Properties

The following three mortar mixtures produced are:
Reference (identified as Ref)
Based on Reference with addition of 10% OMYACARB® FT (identified as 10%)
Based on Reference with addition of 15% OMYACARB® FT (identified as 15%).

All three mixes had a water-binder ratio (w/b) of 0.3 and were not air entrained. Table 1 presents all three mortar mixtures composition and fresh properties. As shown in Table 1, for mixtures containing OMYACARB® FT, the sand content was adjusted to keep the mortar total volume at 1 m³ (1000 L). Fresh properties were determined in compliance with ASTM C185—*Standard Test Method for Air Content of Hydraulic Cement Mortar* and ASTM C1437—*Standard Test Method for Flow of Hydraulic Cement Mortar*. Mixing sequences used in the laboratory are given in Table 2. Note that OMYACARB® FT was the last constituent added in the mixer.

To determine the flow of each mortar mixture, a conical mold was placed at the center of the flow table. Once the mortar was adequately tampered in the mold, the mold was lifted away from the mortar and the table was immediately dropped 25 times in 15 s. The flow for all mixtures was 0%, which indicates that the mortars were stiff. In fact, mixtures tended to crumble instead of flowing. Nevertheless, the crumble material diameter was measured. However, this value should not be considered as a real flow since the flow is defined as the resulting increase of the base diameter of the mortar mass. The w/b of 0.3 for the mortars, which are normally stiff, explains the difficulties to get a proper flow of the mortar mass during the test.

The air content was determined with a cylindrical measure of 400 ml±1 ml. The mortar was adequately compacted into the measure and then the mass was determined. The air content was calculated from the measured density of the mortar, the known densities of the constituents, and the mixture proportions. The air content measured on fresh mortars ranged from 20.3% to 7.0%. The air content of the reference mixture was the highest at 20.3%, which correlates with the low unit weight of 1996 kg/cm³. Due to the stiffness, it is believed that this air is not entrained air but compaction voids. The 15%-mixture had the lowest air content with 7.0% and corresponds to the highest unit weight (2289 kg/m³). Thus, OMYACARB® FT, as a sand replacement in this type of mortar mix, tends to reduce air content (voids) and to increase unit weight. Moreover, it could be concluded that the replacement of sand by OMYACARB® FT improves the consolidation of the mortar. This is evidenced by the low air (voids) content.

TABLE 1

Mortar Mixtures Composition

| Mix ID | Ref (w/b = 0.3) | 10% (w/b = 0.3) | 15% (w/b = 0.3) |
|---|---|---|---|
| Cement (kg/m³) [1] | 525 | 525 | 525 |
| OMYACARB ® FT (kg/m³) | — | 52.5 | 78.8 |
| Water (kg/m³) | 157.5 | 173.3 | 181.1 |
| Sand (kg/m³) [2] | 1750 | 1655 | 1608 |
| Fresh properties | | | |
| Unit Weight (kg/m³) | 1996 | 2179 | 2289 |
| Air content (%) | 20.3 | 12.0 | 7.0 |
| Flow (%) [3] | 0 | 0 | 0 |

[1] Type GU Portland cement - manufactured by Lafarge
[2] Sand - Ladufo, Laval University Laboratory, Qc
[3] Expressed as a percentage of the original base diameter

TABLE 2

Mixing sequence

| Reference mixture | | Mixtures with Omyacarb FT | |
|---|---|---|---|
| 1 | Water | 1 | Water |
| 2 | Sand (wait until sand is fully wet) | 2 | Sand (wait until sand is fully wet) |
| | | 3 | Cement |
| 3 | Cement | 4 | Mixing for 2 minutes |
| 4 | Mixing for 5 minutes | 5 | OMYACARB ® FT |
| | | 6 | Mixing for an additional 5 minutes* |

*This mixing time is necessary to achieve a good homogenization of the mortar mix Compressive Strength Once the fresh properties were determined, 9 cube specimens were prepared to perform compressive strength tests. Determination of compressive strength was made on each mortar mixture at 1, 7, and 28 days. For all maturities, 3 mortar cube specimens of 50×50×50 mm were tested according to ASTM C109—*Standard Test Method for Compressive Strength of Hydraulic Cement Mortars* (*Using 2-in. or [50-mm] Cube Specimens*). Specimens were cured in saturated lime water until testing time.

Variations were encountered in compressive strength test results. A maximum permissible range between specimens at the same test age is 8.7% of the average when three cubes are used. Thus, individual results exceeding this limit were omitted in the calculation of the average. Otherwise mentioned, results in Table 3 are the average of 2 cubes.

The results range between 19.2 and 50.3 MPa at 28 days. The 15%-mixture presents the highest compressive strength at every maturity. The addition of OMYACARB® FT as a replacement of sand had a beneficial effect on compressive strength. The beneficial influence observed on the compressive strength is explained by the low air (voids) content in this mixture since it appears to have been more easily consolidated. Moreover, Neville mentioned that for each percent of air (voids) in concrete, 5.5% of compressive strength could be loss[1]. This is also applicable to mortar and it is observed in the results in Table 3.

TABLE 3

Compressive Strength

| | Maturity | | |
|---|---|---|---|
| Mix ID | 1 day | 7 days | 28 days |
| Ref | 11.7 | 14.1 | 19.2 |
| 10% | 22.9 | 33.2[1] | 30.6 |
| 15% | 34.2[1] | 44.9[1] | 50.3 |

[1]Average of 3 results

CONCLUSION

The influence of replacing the sand in mortar mixtures by OMYACARB® FT on the compressive strength was studied.

The percentages of sand replacement of 10% and 15% by OMYACARB® FT (calculated on the cement weight) were beneficial on the compressive strength. The increase in compressive strength is due to lower void contest in these mortars. Lower voids content resulted in an increase of unit weight. It could be mentioned that the addition of OMYACARB® FT did help in the consolidation of the mortar specimens.

Although the present invention has been explained hereinabove by way of a preferred embodiment thereof, it should be pointed out that any modifications to this preferred embodiment within the scope of the appended claims is not deemed to alter or change the nature and scope of the present invention.

The invention claimed is:

1. A concrete mix comprising a hydraulic cement binder, aggregates and an ultrafine particulate material, wherein the ultrafine particulate material is a ground calcium carbonate surface treated with an efflorescence control agent, wherein the surface treated calcium carbonate has a medium particle size of 1.4 microns, with a variation of ±10%, and a BET specific area of 5.5 $m^2/g$, wherein the efflorescence control agent is calcium stearate, zinc stearate, sodium stearate, butyl stearate, stearic acid, a stearic acid derivative, a stearic acid salt, a tall oil fatty acid, a vegetable or animal fat, an emulsion based on white grease, a silicone compound, a siliconate, a siloxane, a wax, a wax emulsion, a soap, a mineral oil, a paraffin, or a bitumen.

2. The concrete mix of claim 1, wherein the ultrafine particulate material is present in an amount representing up to 15%, with a variation of ±10%, of the weight of the hydraulic cement binder within the mix.

3. The concrete mix of claim 1, wherein the efflorescence control agent is a calcium stearate, zinc stearate, sodium stearate, butyl stearate, stearic acid, a stearic acid derivative, a stearic acid salt, a tall oil fatty acid, a vegetable or animal fat, an emulsion based on white grease, a silicone compound, a siliconate, a siloxane, a wax, a wax emulsion, a mineral oil, a paraffin, or a bitumen.

4. The concrete mix of claim 1, wherein the efflorescence control agent is stearic acid.

5. The concrete mix of claim 1, wherein the hydraulic cement binder is Portland cement.

6. A method of making concrete with anti-efflorescence properties comprising the steps of:
   a. mixing a hydraulic cement binder, aggregates, water, and an ultrafine particulate material, wherein the ultrafine particulate material is a ground calcium carbonate surface treated with an efflorescence control agent, wherein the surface treated calcium carbonate has a medium particle size of 1.4 microns, with a variation of ±10%, and a BET specific area of 5.5 $m^2/g$, and wherein the efflorescence control agent is calcium stearate, zinc stearate, sodium stearate, butyl stearate, stearic acid, a stearic acid derivative, a stearic acid salt, a tall oil fatty acid, a vegetable or animal fat, an emulsion based on white grease, a silicone compound, a siliconate, a siloxane, a wax, a wax emulsion, a soap, a mineral oil, a paraffin, or a bitumen;
   b. pouring the mixture of step a) into a form; and
   c. curing the mixture.

7. The method of claim 6, wherein the ultrafine particulate material is present in an amount representing up to 15%, with a variation of ±10%, of the weight of the hydraulic cement binder within the mix.

8. The method of claim 6, wherein the efflorescence control agent is a calcium stearate, zinc stearate, sodium stearate, butyl stearate, stearic acid, a stearic acid derivative, a stearic acid salt, a tall oil fatty acid, a vegetable or animal fat, an emulsion based on white grease, a silicone compound, a siliconate, a siloxane, a wax, a wax emulsion, a mineral oil, a paraffin, or a bitumen.

9. The method of claim 6, wherein the efflorescence control agent is stearic acid.

10. The method of claim 6, wherein the hydraulic cement binder is Portland cement.

11. A method of reducing efflorescence in a concrete product obtained from a concrete mix, the method comprising introducing as an additive into the concrete mix an ultrafine particulate in an amount effective to reduce efflorescence in a concrete product obtained from the concrete mix, wherein the concrete mix comprises a hydraulic cement binder and aggregates, wherein the ultrafine particulate material is calcium carbonate surface treated with an efflorescence control, wherein the surface treated calcium carbonate has a medium particle size ranging from 1.4 to 3 μm and a BET specific area of less than 10 $m^2/g$, and wherein the efflorescence control agent is calcium stearate, zinc stearate, sodium stearate, butyl stearate, stearic acid, a stearic acid derivative, a stearic acid salt, a tall oil fatty acid, a vegetable or animal fat, an emulsion based on white grease, a silicone compound, a siliconate, a siloxane, a wax, a wax emulsion, a soap, a mineral oil, a paraffin, or a bitumen.

12. The method of claim 11, wherein the surface treated calcium carbonate has a medium particle size of about 1.4 microns, and a BET specific area of 5.5 $m^2/g$.

13. The method of claim 11, wherein the ultrafine particulate material is present in an amount representing up to 15%, with a variation of ±10%, of the weight of the hydraulic cement binder within the mixture.

14. The method of claim 11, wherein the efflorescence control agent is a calcium stearate, zinc stearate, sodium stearate, butyl stearate, stearic acid, a stearic acid derivative, a stearic acid salt, a tall oil fatty acid, a vegetable or animal fat, an emulsion based on white grease, a silicone compound, a siliconate, a siloxane, a wax, a wax emulsion, a mineral oil, a paraffin, or a bitumen.

15. The method of claim 11, wherein the efflorescence control agent is stearic acid.

16. The method of claim 11, wherein the hydraulic cement binder is Portland cement.

* * * * *